March 6, 1928.

A. ARMSTRONG 1,661,156

PRODUCTION OF WELDED WIRE FABRIC AND APPARATUS THEREFOR

Filed Nov. 18, 1924

Inventor.
Alan Armstrong
By
Rogers, Kennedy Campbell
Attys.

March 6, 1928.

A. ARMSTRONG 1,661,156

PRODUCTION OF WELDED WIRE FABRIC AND APPARATUS THEREFOR

Filed Nov. 18, 1924    6 Sheets-Sheet 2

Inventor.
Alan Armstrong
By
Rogers, Kennedy Campbell
Attys.

Inventor:
Alan Armstrong
By Rogers, Kennedy Campbell
Attys.

March 6, 1928.
A. ARMSTRONG
1,661,156
PRODUCTION OF WELDED WIRE FABRIC AND APPARATUS THEREFOR
Filed Nov. 18, 1924 6 Sheets-Sheet 6
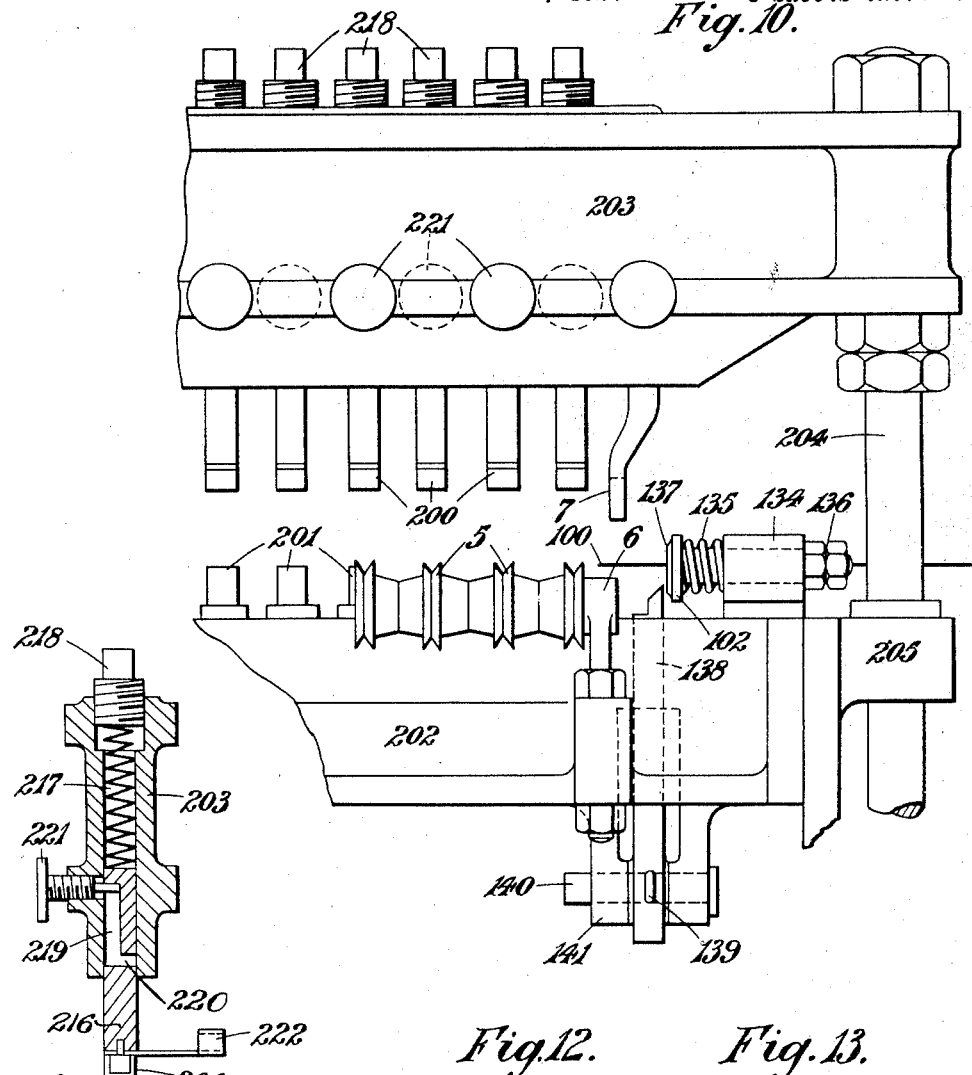
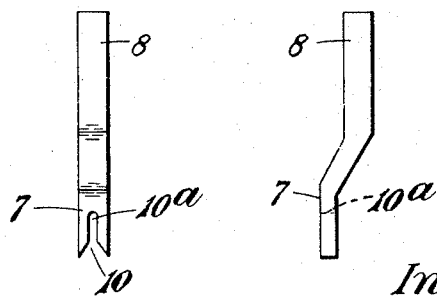
Inventor
Alan Armstrong
By Rogers, Kennedy Campbell
Attys.

Patented Mar. 6, 1928.

1,661,156

UNITED STATES PATENT OFFICE.

ALAN ARMSTRONG, OF TYNEMOUTH, ENGLAND, ASSIGNOR TO PILKINGTON BROTHERS LIMITED, OF LIVERPOOL, ENGLAND, A BRITISH COMPANY.

PRODUCTION OF WELDED WIRE FABRIC AND APPARATUS THEREFOR.

Application filed November 18, 1924, Serial No. 750,715, and in Great Britain November 20, 1923.

This invention relates to a process and apparatus for producing wire fabric in which the wires are electrically welded at their crossing points, and it has for its object improvements in that type of process and apparatus in which a series of warp wires are retained in spaced relationship each between the two dies of a series of pairs of welding dies, whereby a fabric with accurate meshes and of any size of wire is formed and electrically welded quickly and economically.

The process of, and apparatus for, manufacture involves among other features the automatic feeding forward step-by-step of the non-crossing wires to produce a uniform or a pattern mesh, the intermittent traversing of a crossing wire relatively to the non-crossing wires, the severing of the last applied crossing wire from its source of supply, the welding of the crossing wire to the series of non-crossing wires, and the straightening of the fabric.

The apparatus for carrying out the process may be constructed in many different forms, and it is therefore to be understood that the one which is hereinafter described is given merely as a convenient example.

The invention will be described as applied to the production of a fabric with rectangular meshes, but it is not limited to that particular production.

For convenience of description, the series of non-crossing wires are herein termed the warp or the warp wires, and the crossing wires are herein termed the weft or the weft wires.

In the accompanying drawings:—

Figure 9 is a section of the same taken on a line at right-angles to that on which Figure 8 is taken;

Figure 10 is a part elevation of the welding dies and beams as seen from the left-hand end of Figure 2;

Figure 11 is a vertical section of a pair of welding dies in their beams, and

Figures 12 and 13 are views of a guide seen from the front and the left-hand side of the apparatus respectively.

Figure 1:
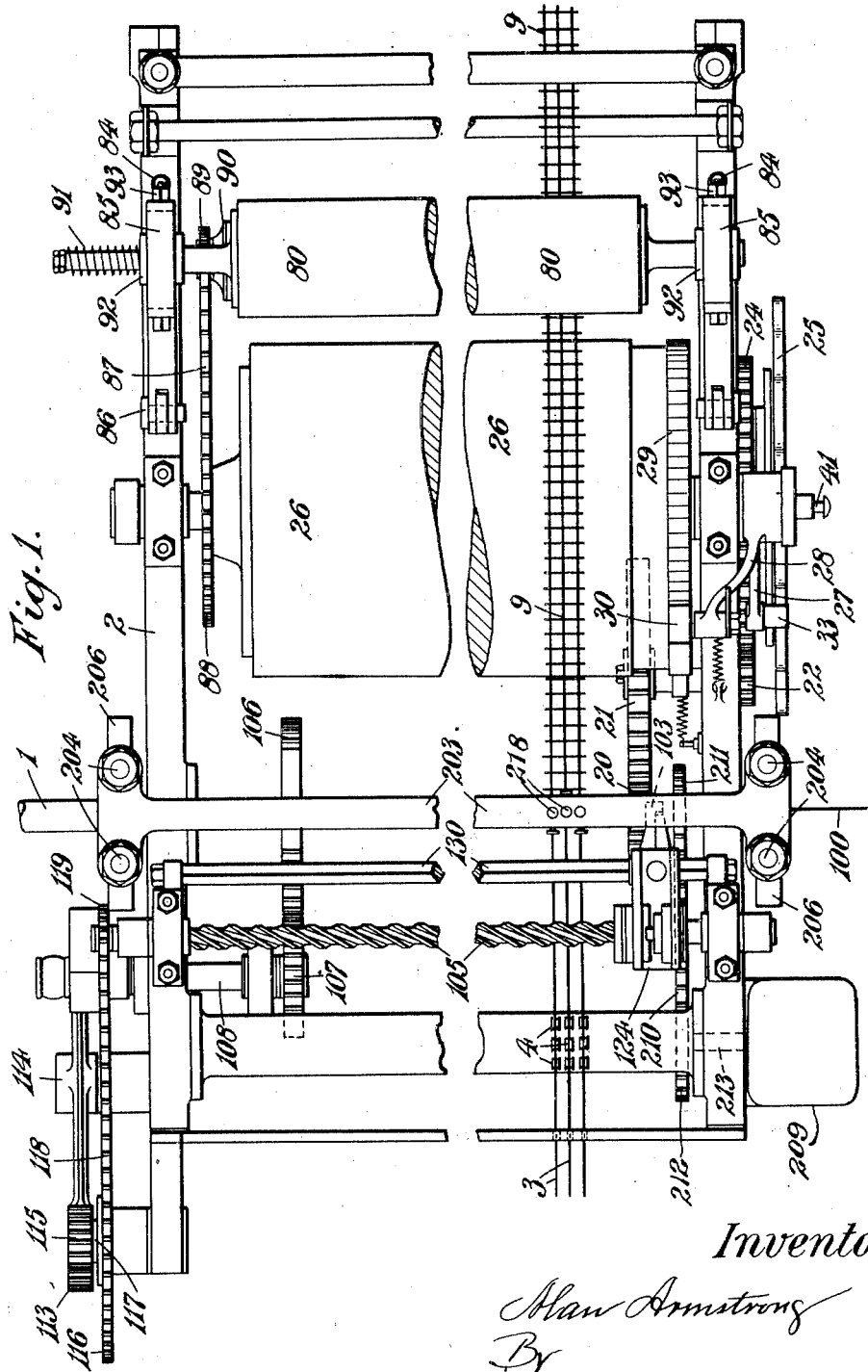
Figure 1 is a plan view of the apparatus (the centre portion being broken away)

In the following description, reference numbers are allotted to different parts of the apparatus as follows:—to the frame and general structure, numbers 1 upwards, to the fabric feed, numbers 20 upwards, to the feeding and straightening rolls and guillotine, numbers 80 upwards, to the weft wire feed, numbers 100 upwards, to the welding devices, numbers 200 upwards.

General structure.

Figure 2:
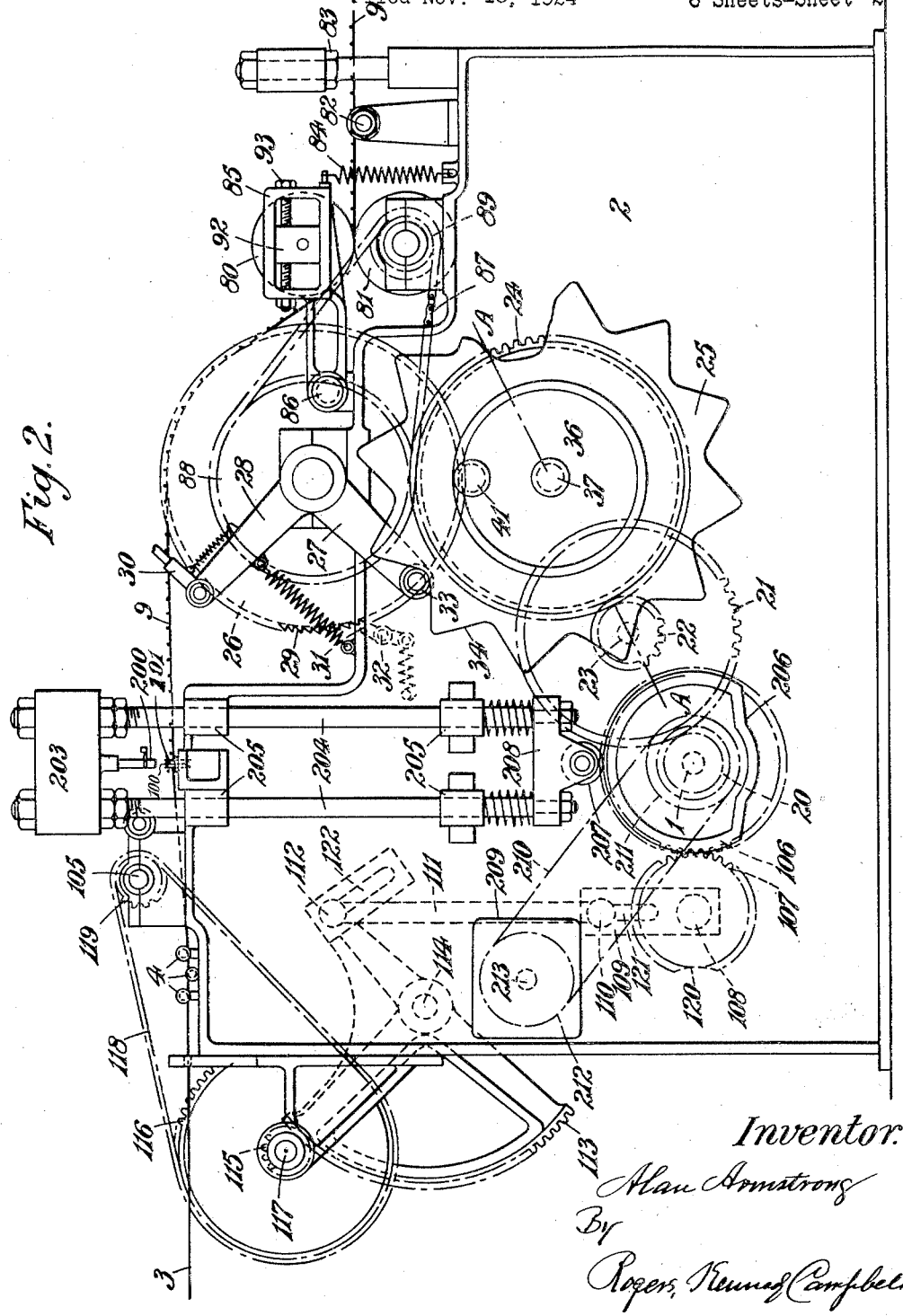
Figure 2 is an elevation of the front thereof.

Referring to Figures 1 and 2, the main driving shaft 1 supported in the two side frames 2 of the apparatus, carries a pinion 20 (Figure 2) which meshes with a reduction gear 21, 22 carried on a shaft 23. The pinion 22 meshes with a wheel 24 on a stud 37 which, as hereinafter more fully described, turns a cam plate 25, which operates the warp wire feed drum 26 by means of a ratchet lever 27, 28.

The warp wires 3 of which three only are shown in Figure 1, pass from spools (not shown) at the left-hand end of the apparatus, through straightening rollers 4 (Figure 2), between the welding dies 200, 201 (Figures 10 and 11) after which the warp wires are, by the addition of weft wires, formed into fabric 9. The fabric then passes partially round the feed drum 26, between a pair of straightening and feeding rollers 80, 81 over a guide roll 82 and through a guillotine 83.

The weft wire 100 is contained in a spool (not shown) at the front of the apparatus, and is brought through a set of straightening rollers 101 (Figure 2) and a nozzle 102 (Figure 10) at one end, and on the centre line, of the welding dies 200, 201. A finger 103, 104 (Figures 3 and 4) adapted to grip the end of the weft wire 100, protruding from the nozzle 102, is mounted (as hereinafter described) on a lead screw 105, by means of which the finger 103, 104, is traversed across the warp wires 3 between the welding dies 200, 201, and is then held stationary so as to retain the weft wire in this position.

The horizontal or approximately horizontal disposition of the warp and weft wires is important for two reasons; first, because there is no tendency for the weft wire to sag when retained only at its ends, whereby the production of a fabric with accurately rectilinear meshes is ensured, and secondly, because the molten metal at the well has less tendency to drop away.

The traverse of the finger 103, 104, is effected as follows:—The main shaft 1 carries an intermittent gear wheel 106, meshing with an intermittent gear wheel 107 on shaft 108. This shaft carries a crank 109 with crank-pin 110 and connecting rod 111, the upper end of the latter pivoted to a crank-pin 112 on a gear sector 113 pivoted on a stud 114. The gear sector 113 meshes with a pinion 115 attached to a chain wheel 116, both turning on a stud 117. A chain 118 connects the wheel 116 to a pinion 119 on the lead screw 105.

The welding dies are in pairs, the lower 201 of all the pairs being fixed in a lower beam 202 (Figures 10 and 11) attached to the frame of the apparatus, and the upper 200 of all the pairs being mounted in an upper beam 203 adapted to be reciprocated vertically by means of paired guide rods 204 (Figures 1, 2 and 10) sliding in fixed guides 205. The reciprocation of the upper beam 203 is effected by two cams 206 carried on opposite ends of the shaft 1, pairing with rollers 207 carried in yokes 208 fixed to the respective pairs of guide rods 204.

A welding switch 209 represented diagrammatically in Figures 1 and 2, is driven by a chain 210 connecting a chain wheel 211 on the main shaft 1 with a chain wheel 212 on the switch shaft 213.

One turn of the main shaft 1 produces the feed of one weft wire 100, the return traverse of the weft finger 103, 104, one welding operation and one-twelfth turn of the cam plate 25, and constitutes one complete cycle of the apparatus.

*Fabric feed.*

The mechanism for automatically effecting the feed of the finished fabric forms the subject-matter of a separate application for Letters Patent and is described herein merely in order to demonstrate its co-ordination with the subject-matter of the present invention.

The fabric feed drum 26 is turned clockwise (as viewed in Figure 2) so as to feed the fabric by the amount corresponding to the desired pitch of the weft wires, by means of a ratchet wheel 29 fixed to the drum, and a ratchet 30 pivoted on the lever arm 28; a detent 31, pivoted to the frame 2 at 32 engaging with the ratchet wheel 29.

The lever 27, 28, is moved to feed the drum by means of a roller 33 on its arm 27 engaging under spring pressure with the cam surfaces 34 of the cam plate 25. The radial height of the cam surfaces 34 therefore determines the amount of the feed and the pitch of the weft wires.

Figure 6:
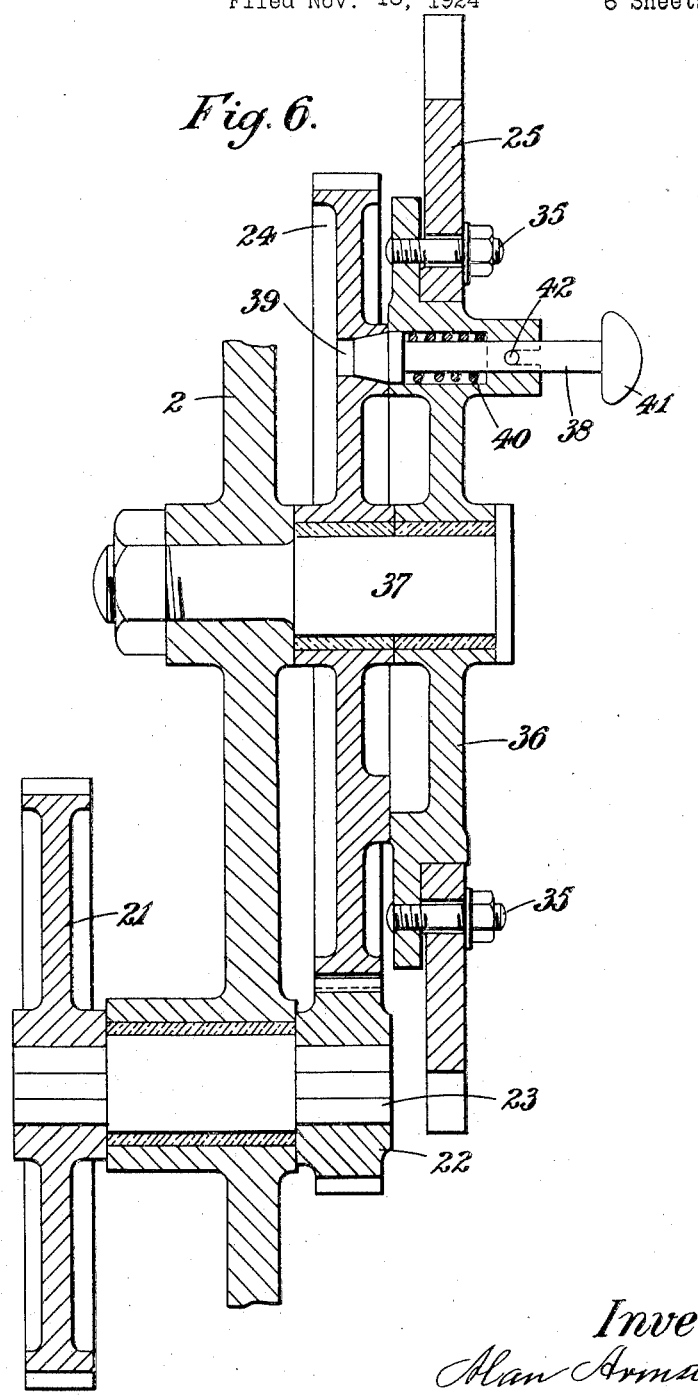
Figure 6 is a section through a portion of the apparatus along the inclined line A—A, Figure 2, showing the cam plate with its disc and driving means.

The cam plate 25 is arranged for easy disengagement from its driving mechanism as follows:—The cam plate 25 (see particularly Figure 6) is held by studs 35 on the cam driving disc 36, which is adapted to turn on the stud 37 which carries the gear wheel 24. The cam driving disc 36 can be locked to, or freed from, the gear wheel 24 by means of a pin 38, slidably mounted in the disc 36 and adapted to engage in a hole 39 on the gear wheel 24. The pin is pressed by a spring 40 into engagement with the hole 39 and can be manually withdrawn therefrom by its knob 41 and held out of engagement by the pin 42, on giving the pin 38 a partial turn when withdrawn.

By means of this device, the feed of the fabric may be stopped, without stopping the main shaft 1, and may be started again by releasing the pin 38, which locks together the gear wheel 24 and the cam driving disc 36 in the same relative positions as those at which they were disengaged.

The pitch of the weft wires may be varied by attaching to the apparatus cam plates having cam surfaces of different radial heights, and a pattern, in which succeeding weft wires are at different pitches, may be produced by attaching a cam plate in which succeeding cam surfaces are of different radial heights.

The gear ratio between the pinion 20 and the wheel 24 is preferably 1 to 12 so that a considerable number of different patterns can be produced by substituting different cam plates 25 and without changing the pinions and wheels of the reduction gear.

Figure 7:
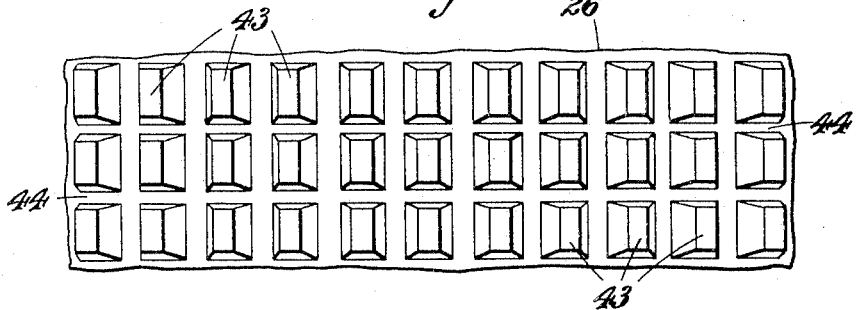
Figure 7 is a plan view of a portion of the feed drum showing the teeth thereon.
Figure 8:
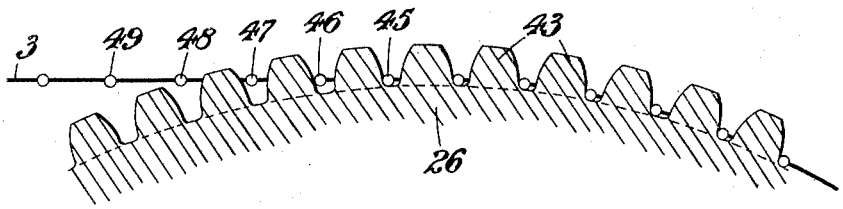
Figure 8 is a section of the same showing the fabric.

The feed drum 26 is provided with teeth 43 (Figures 7, 8 and 9) parallel to its axis, the pitch of the said teeth being equal to or a sub-multiple of the pitch of the smallest mesh desired between the warp wires 3. The teeth of the ratchet wheel 29 have an angular pitch equal to, or a sub-multiple of, that of the teeth 43. The detent 31 is preferably adjustable in position or length, and is so adjusted that, after the feed has been effected the feed drum can turn backwards through a small angle under the tension of the warp wires, before being held by the detent, and thereby diminish the said tension during the welding operation.

Figure 9:
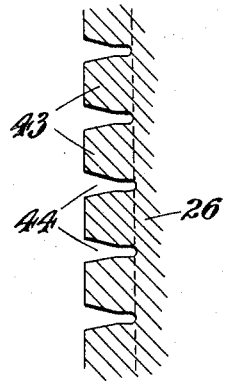

The teeth 43 of the drum 26 are cut by grooves 44 at a pitch equal to that of the welding dies. The warp wires enter the said grooves and the depth of the grooves is such that the weft wires can rest at the bottom of the hollows between the teeth 43 as shown at 45, Figure 8. The grooves 44, as shown best in Figure 9, are given a tapering form so as to guide the warp wires into their correct position on the feed drum, centrally of the groove. The teeth 43 are so shaped that when one weft wire 46 is engaged by a line of teeth, the following weft wires, 47, 48, 49, as the feed progresses, pass quite clear of the tops of the teeth and come into contact with the teeth at a line such as that occupied by the weft wire 47 which is distant from the top of the teeth a considerable portion of the height of the teeth. By this means provision is made for the correct engagement of a mesh wire which may have become distorted.

*Weft wire feed.*

The gear wheel 106 which meshes with the wheel 107 and drives the weft wire feed apparatus, is provided with teeth over only a portion of its circumference, the remaining portion of the latter being plain and engaging with a plain portion 120 of the wheel 107, the two wheels 106 and 107 thus constituting an intermittent gear of known type, with equal numbers of teeth on the two wheels.

The plain portion of the wheel 106 engages with the plain portion of the wheel 107 while the weft feeding finger 103, 104 is at the far side of the apparatus remote from the weft wire nozzle 102, and the cycle of the apparatus, starting from this position is as follows:—

By the teeth on the wheel 106 engaging with the teeth on the wheel 107, the finger 103, 104 is traversed by the lead screw 105 to the near side of the apparatus and reaches the nozzle 102 approximately when the crank 109 is on dead centre in the position shown in Figure 2. The continued rotation of the wheel 107 reverses the sense of rotation of the lead screw 105 and the finger 103, 104, then engaging the weft wire, is traversed back again to the far side of the apparatus and remains stationary there during the period of engagement of the plain portion of the wheel 106 with the plain portion 120 of the wheel 107. During this period when the finger 103, 104 and weft wire are stationary, the welding is effected as hereinafter described.

The crank pin 110 is held in a slot 121 in the crank 109 and is capable of being fixed at any radius within the limits of that slot. By thus varying the radius or throw of the crank pin 110, the extent of the traverse of the finger 103, 104 is varied, and consequently also the width of the fabric produced.

When, however, it is desired to produce a fabric of width less than the maximum capacity of the apparatus, and the radius of the crank pin 110 is diminished until the traverse of the finger 103, 104 is such as to produce a fabric of desired width, the diminished traverse of said finger remains central with respect to the apparatus, and the finger does not reach the nozzle 102 to pick up the weft wire. Provision is therefore made for rotating the lead screw 105 without change in the position of the crank pin 110, so that the finger 103, 104, may be brought up to the nozzle 102 and effect its diminished traverse from this position. Such independent rotation of the lead screw 105 may be effected by disconnecting, loosening, or varying the position or length of one of the connections between the crank pin 110 and the lead screw 105, and this, in the example illustrated, is conveniently effected by mounting the pin 112 in a slot 122 in the gear sector 113, the said slot being arcual, or, for constructional convenience, straight and approximately arcual.

Figure 3:
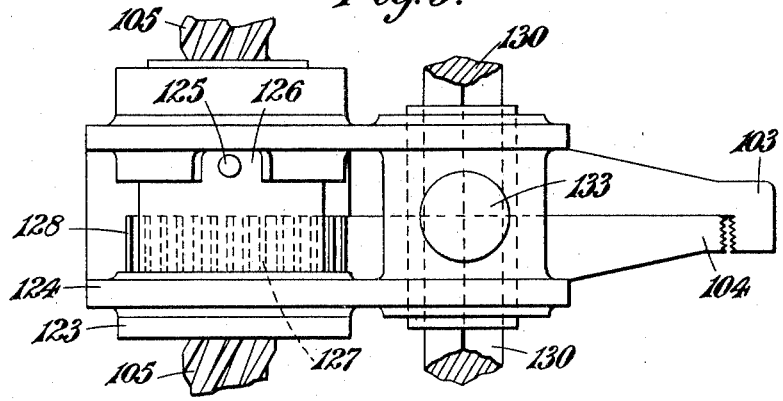
Figure 3 is a plan view of the weft wire finger.

The weft wire finger 103, 104, and its connection with the lead screw 105 are constructed as follows:—Referring to Figures 3, 4 and 5, a nut 123 engaging the lead screw 105, is adapted to turn in a housing 124, of which the outer jaw 103 of the finger is an extension. The extent to which the nut 123 can turn in the housing 124, is limited to a small angle by a pin 125 in said nut which engages in a gap or slot 126 in the housing. The nut 123 is provided with teeth 127 on the lower portion of its periphery and the said teeth 127 engage with a rack 128 which is an extension of the inner jaw 104 of the finger. The rack 128 is adapted to slide in a groove 129 in the housing 124 as shown in Figure 5. It will be seen that a counter-clockwise rotation (Figure 4) of the nut 123 in the housing 124 closes the jaws 103, 104, of the finger, while a clockwise rotation opens them.

Figure 4:
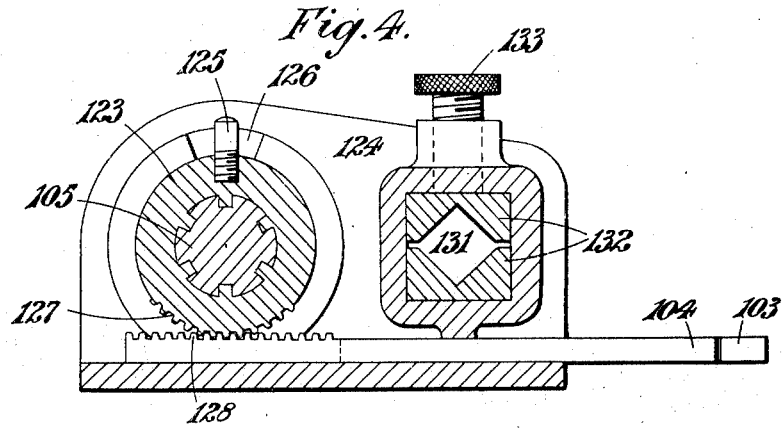
Figure 4 is a vertical section thereof.
Figure 5:
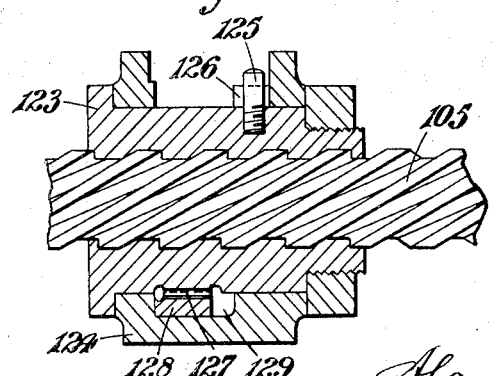
Figure 5 is a vertical section thereof on a plane at right angles to that of Figure 4.

The housing 124 is prevented from turning about the lead screw 105 by a bar 130 (Figures 1 and 3) which is held in the frames 2 and passes through a hole 131 (Figure 4). The hole 131 is formed by two blocks 132 with V grooves, mounted in the housing 124, the upper of said blocks being capable of a small vertical motion so that it may be pressed down on to the bar 130, by a screw 133. By turning the screw 133, the pressure of the blocks 132 on the bar 130 and consequently the frictional resistance between the blocks and the bar to the traverse of the housing 124, may be adjusted.

The operation of the device is as follows:—Let it be assumed that the housing 124 is being traversed towards the near side of the apparatus by clockwise rotation of the lead screw 105, the jaws 103, 104 being open. On reaching the end of its traverse, the housing 124 will remain stationary with the end of the weft wire between the open jaws 103, 104, while the lead screw 105 reverses its sense of rotation. On beginning to turn counter-clockwise, the lead screw 105 turns the nut 123 angularly within the housing 124 before causing any back traverse, by reason of the friction of the blocks 132 on the bar 130. This turning of the nut 123 causes the rack 128 with jaw 104 to move to the right (Figures 3 and 4) and grip the end of the weft wire between the jaws 103, 104. When further rotation of the nut 123 in the housing 124 is prevented by closure of the jaws 103, 104, the continued rotation counter clockwise of the lead screw 105 traverses the housing 124 to the far side of the apparatus. When the housing reaches the far side, it remains stationary for a period determined by the extent of the plain portion on the wheel 106, and the pressure between the jaws 103, 104 is released. On reversal of the sense of rotation of the lead screw 105, the jaws 103, 104 are first opened and then the housing 124 is traversed to the near side of the machine.

It will be seen that the grip of the jaws 103, 104 on the weft wire depends on the resistance offered to the traverse of the housing, and this depends on the resistance to feed of the weft wire and also on the friction between the blocks 132 and the bar 130. Consequently the grip of the jaws on the weft wire, can be adjusted by turning the screw 133, and also varies automatically with variations in the resistance to feed of the weft wire.

The weft wire nozzle 102 (Figure 10) is slidingly held in a piece 134 attached to the beam 202 carrying the lower welding dies 201. It is pressed to the left, as viewed in Figure 10, by a spring 135, its position being determined by adjustable nuts 136. Its left-hand face 137 is flat and has a central hole through which the weft wire 100 passes freely. The flat face 137 co-acts with a cutter 138 which, on the descent of the upper beam 203, shears the weft wire flush with the face 137, as hereinafter described.

The finger 103, 104 in traversing to the front of the apparatus, that is to say, towards the nozzle 102, strikes the face 137 of the nozzle and presses it to the right against the influence of the spring 135; the end portion of the weft wire, which was cut off flush with the face 137, is then between the two jaws of the finger and is gripped by them on reversal of the sense of rotation of the lead screw 105.

The cutter 138 is adapted to slide in the beam 202 and is operated by the end or arm 139, of a lever which is seen in Figure 10 protruding through a slot in the cutter 138. The lever 139 is pivoted at 140 to a bracket 141 attached to the beam 202. The other arm of the lever 139 is struck on descent of the beam 203, by a rod, not shown, attached to the said beam 203. The cutter 138 is operated to cut the wire 100 just before the beam 203 completes its downward course, and during the period when the upper welding dies 200 are being pressed upwards against their springs 217, Figure 11. The wire 100 is therefore held in place by the pressure of the dies 200, before it is severed.

*Wire guides.*

The warp wires 3 are guided so as to pass centrally over their respective lower welding dies 201 and sufficiently above them to permit the traverse of the finger 103, 104, by rollers 5 mounted on a bar 6 attached to the lower beam 202 (shown in Figure 10 but omitted from Figures 1 and 2).

The weft wire is held in position at the front end by the nozzle 102, and at the other end by the finger 103, 104.

It is preferred however to employ, close to each edge of the fabric, a weft wire guide such as that shown in Figures 12 and 13 and at 7 in Figure 10, which permits a small adjustment of the position in which the weft wire is held. The guide 7 is formed on the lower end of a bar 8 which is adapted to enter any one of the holes in the upper beam 203 which carry the welding die plungers 216, Figure 11, and to be secured therein at any height by a set screw 221, as shown at 7 (Figure 10). The guide 7 is cranked away from the centre line of the bar 8, as shown in Figure 13, so that by slightly turning the bar 8 in the beam 203, the guide may be moved slightly in the direction of the warp wires, and thereby the direction across the apparatus in which the weft wire is held, may be slightly varied.

The guide 7 has at its lower end a V notch 10 terminating in a slot 10ª, the V notch 10 serving to guide the wire into the slot 10ª, as the guide 7 descends with the beam 203.

In the operation of the apparatus, the guides 7 at the edges of the fabric, are turned in the beam 203 until each weft wire welded in the fabric, is found to engage simultaneously with the teeth 43 on the drum 26 along the whole length of the drum.

When a fabric of reduced width is being made, the guides 7 are fixed in the beam 203, one close to each edge of the fabric, in the holes in the beam next to those occupied by the operative series of plungers 216.

The guides 7 also serve the purpose of pressing down the weft wire into its welding position and thereby preventing the upward pressure of the weft wire, when depressed from its initial position, action in opposition to the springs 217 of the plungers 216. The warp wires 3 pass just clear of the lower welding dies to avoid wear of the latter when said wires are fed; the weft wire 100 passes sufficiently clear of the warp wires, to avoid contact between the finger 103, 104 and the warp wires during the traverse of the finger; therefore, to bring the warp wires in contact with the lower welding dies and then the weft wire in contact with the warp wires, that portion of the weft wire between the welding dies must be depressed by an amount equal to the sum of these two clearances. Since, however, the ends of the free weft wire cannot be depressed, the depression of the portion between the ends causes an upward pressure which, if the upper welding dies were used to depress the weft wire, would vary from each end to the centre of the weft wire and at the moment of welding, would make the resultant pressure between the welding dies variable from each end to the centre of the weft wire. The guides 7 are so adjusted in height that, when the upper welding beam 203 is in its lowest position the upper end of the notch 10 acts to depress the weft wire into contact with the warp wires and the latter into contact with the lower welding dies. By this means any upward pressure of the weft wire on the upper welding dies due to its depression, is avoided and the pressure between each pair of welding dies is that due to the respective spring 217.

The weft wire feeding means and the wire guides are important features of the apparatus and, while applicable to any ordinary size of wire, are designed specially for the production of a wide fabric with fine weft wires and an accurate mesh. The fine weft wire is maintained straight by retaining it in tension first between its holding means at the ends of the series of welding dies and then between its guides, and the tension is maintained until the wire is held in position at each crossing point with the warp wires by the welding dies.

Feeding and straightening rolls.

In order to diminish the pressure between the teeth of the feed drum and the weft wires of the fabric in feeding the fabric, and also in order to straighten the fabric from any curve which it may have, the following mechanism is provided. The feeding and straightening rolls 80, 81, are covered with a soft material such as rubber, and grip the fabric between them under the pressure of springs 84 which act on the housings 85 of the roll 80 each said housing being pivoted at 86, to the respective side frame 2. The roll 81 is driven through a clutch 90, Figure 1, by a chain 87 on chain wheels 88 and 89 attached respectively to the feed drum 26 and clutch 90. The clutch 90 is a friction clutch with spring 91, adapted to permit of slip between the chain wheel 89 and the roll 81. The chain wheel 89 is driven at such a speed relatively to that of the feed drum 26 that, if there were no slip in the clutch 90, the peripheral speed of the roll 81 would be slightly in excess of the peripheral speed of the drum 26. The friction in the clutch 90 is so adjusted that the pull exercised on the fabric by the feed rolls 80, 81 is nearly, but not quite, sufficient to pull the weft wires of the fabric from the teeth of the drum 26.

The feed roll 80 is mounted in blocks 92 adapted to slide in the housings 85 and to be held in any position therein by screws 93. By varying the position of the blocks 92 in the housings 85, the feed roll 80 may be positioned closer to or further from the drum 26, whereby any permanent curve previously in the fabric may be counteracted by the inverse curve taken by the fabric in passing from the drum 26 to and between the feed rolls 80 and 81.

Welding apparatus.

The mounting of the welding dies 200 and 201 in the respective beams 202 and 203 is shown in Figure 11. The lower welding die 201 is mounted on a bolt 214, fast in, but insulated from, the lower beam 202 and provided with a cable lug 215. The upper welding die 200 is mounted on a plunger 216 adapted to slide in a hole in the upper beam 203 and pressed downwards by the spring 217, the force exercised by the latter being adjustable by means of a screw plug 218. The plunger has a longitudinal slot 219 terminating at its lower end in a hole 220. A screw pin 221 engages with the slot 219 and, when the plunger 216 is in its normal operative position, this pin serves to limit the downward motion of the plunger while leaving it free to rise against the pressure of the spring 217.

When it is desired that the welding die should be inoperative, either for making a larger mesh or a pattern or a fabric of reduced width, the plunger 216 is raised and the screw pin 221 is turned so as to engage in the hole 220 and thereby hold the plunger in its upward position whereby the welding die remains inoperative. Connection to the welding die 200 is made by a cable lug 222.

Welding circuits and switch.

The switch 209 is adapted to close the primary circuit of a transformer after the secondary circuit thereof has been closed by contact between the warp and weft wires and the two welding dies of each pair, and to open it again before the upper beam 203 rises to break the secondary circuit. The said switch is preferably of a type which makes contact for a definite period, irrespective of the speed at which it is driven.

The welding dies 200, 201 are preferably insulated from their beams 203 and 202 respectively, so that any desired number of them may be grouped in parallel and connected to the secondary circuit of a transformer and a plurality of such circuits may be employed to effect the welding of the weft wire to all the warp wires. In the case of a plurality of circuits, the switch is preferably arranged to make and break the primary circuits in cascade.

Having described my invention, I declare that what I claim and desire to secure by Letters Patent is:—

1. In apparatus of the type described for producing welded wire fabric, the combination with welding dies and means adapted to support warp wires between said dies, of means adapted to feed a weft wire from a source of supply across the warp wires and axially along a line between the welding dies by traction on the free end of the said weft wire.

2. In apparatus of the type described for producing welded wire fabric, the combination with welding dies and means adapted to support warp wires between said dies, of means adapted to feed a weft wire from a source of supply across the warp wires and axially along a line between the welding dies by traction on the free end of said weft wire and means adapted to retain in tension the weft wire after being fed, between points beyond the welding dies until it and the warp wires are gripped by said dies.

3. In apparatus of the type described for producing welded wire fabric, the combination with welding dies, means operative to move one die toward another to grip wires interposed between them, means adapted to support warp wires between the dies, and a source of weft wire supply, of a finger adapted to grip the free end of a weft wire leaving said source, and means operative on the finger to traverse the gripped end across the warp wires and between the welding dies.

4. In apparatus of the type described for producing welded wire fabric, the combination with welding dies, means operative to move one die towards another to grip wires interposed between them, means adapted to support warp wires between the dies, and a source of weft wire supply, of a finger adapted to grip the free end of a weft wire leaving said source, and means operative on the finger to traverse the gripped end across the warp wires and between the welding dies and to retain the grip until the weft and warp wires are gripped by the welding dies.

5. In apparatus of the type described for producing welded wire fabric, the combination with welding dies, means operative to move one die towards another to grip wires interposed between them, means adapted to support warp wires between the dies, and a source of weft wire supply, of a finger adapted to grip the free end of a weft wire leaving said source, a nut operatively connected with the finger, a lead screw engaging the nut and gearing to turn the lead screw, comprising an intermittent gear and a reversing gear.

6. In apparatus of the type described for producing welded wire fabric, the combination with welding dies and means adapted to support warp wires between said dies, of means adapted to feed a weft wire from a source of supply across the warp wires and axially along a line between the welding dies by traction on the free end of said weft wire, and means adjustable to vary the length of weft wire fed across the warp wires.

7. In apparatus of the type described for producing welded wire fabric, the combination with welding dies and means adapted to support warp wires between said dies, of a finger adapted to feed a weft wire from a source of supply across the warp wires and axially along a line between the welding dies by traction on the free end of the said weft wire, means adjustable to vary the length of traverse and the zone of movement of the finger between the welding dies, and means adjustable to vary the zone without changing the length of said traverse.

8. In apparatus of the type described for producing welded wire fabric, the combination with welding dies, means operative to move one die towards another to grip wires interposed between them, means adapted to support warp wires between the dies, and a source of weft wire supply, of a finger adapted to grip the free end of a weft wire leaving said source, a nut operatively connected with the finger, a lead screw engaging the nut, gearing to turn the lead screw, comprising an intermittent gear and reversing gear, and means adjustable to vary the number of turns of the screw between reversals.

9. In apparatus of the type described for producing welded wire fabric, the combination with welding dies, means operative to move one die towards another to grip wires interposed between them, means adapted to support warp wires between the dies, and a source of weft wire supply, of a finger adapted to grip the free end of a weft wire leaving said source, a nut operatively connected with the finger, a lead screw engaging the nut, gearing having a rotating first member and a reciprocating second member, toothed gearing operatively connecting the lead screw with the said second member, and means for rotating the first member thereof intermittently.

10. In apparatus of the type described for producing welded wire fabric, the combination with welding dies, means operative to move one die towards another to grip wires interposed between them, means adapted to support warp wires between the dies, and a source of weft wire supply, of a finger adapted to grip the free end of a weft wire leaving said source, a nut operatively connected with the finger, a lead screw engaging the nut, an intermittent gearing comprising a continuously rotating first member and an intermittently moving second member, a crank intermittently turned by the second member of the intermittent gearing, an oscillating member geared to the lead screw, and a connecting rod connecting the crank to the oscillating member to rock the latter intermittently.

11. In apparatus of the type described for producing welded wire fabric, the combination with welding dies, means operative to move one die towards another to grip wires interposed between them, means adapted to support warp wires between the dies, and a source of weft wire supply, of a finger adapted to grip the free end of a weft wire leaving said source, a nut operatively connected with the finger, a lead screw engaging the nut, an intermittent gearing comprising a continuously rotating first member and an intermittently moving second member, a crank intermittently turned by the second member of the intermittent gearing, an oscillating member geared to the lead screw, a connecting rod connecting the crank to the oscillating member to rock the latter intermittently, and means adjustable to vary the throw of the crank.

12. In apparatus of the type described for producing welded wire fabric, the combination with welding dies, means operative to move one die towards another to grip wires interposed between them, means adapted to support warp wires between the dies, and a source of weft wire supply, of a finger adapted to grip the free end of a weft wire leaving said source, a nut operatively connected with the finger, a lead screw engaging the nut, an intermittent gearing comprising a continuously rotating first member and an intermittently moving second member, a crank intermittently turned by the second member of the intermittent gearing, means adjustable to vary the throw of the crank, an oscillating member geared to the lead screw, a connecting rod connecting the crank to the oscillating member to rock the latter intermittently, and means adjustable to vary the positions of the finger lengthwise of the lead screw when the oscillating member is at dead centre.

13. Apparatus of the type described for producing welded wire fabric as in claim 5, in which the finger comprises two relatively movable parts, one of which tends to be moved by rotation of the lead screw, whereby the first movement of the lead screw in the reverse direction after its return traverse, causes the finger to grip the weft wire, and its further movement in the reverse direction causes the traverse of the finger together with the gripped wire.

14. Apparatus of the type described for producing welded wire fabric as in claim 8, in which the finger comprises two relatively movable parts, one of which tends to be moved by rotation of the lead screw, whereby the first movement of the lead screw in the reverse direction after its return traverse, causes the finger to grip the weft wire, and its further movement in the reverse direction causes the traverse of the finger together with the gripped wire.

15. Apparatus of the type described for producing welded wire fabric as in claim 9, in which the finger comprises two relatively movable parts, one of which tends to be moved by rotation of the lead screw whereby the first movement of the lead screw in the reverse direction after its return traverse, causes the finger to grip the weft wire, and its further movement in the reverse direction causes the traverse of the finger together with the gripped wire.

16. In apparatus of the type described for producing welded wire fabric, the combination with welding dies, means operative to move one die towards another to grip wire interposed between them, means adapted to support warp wires between the dies, and a source of weft wire supply, of a finger comprising two jaws adapted to grip between them the free end of a weft wire leaving said source, a nut capable of small angular movement relative to one jaw of the finger, means connecting the nut to the second jaw whereby its angular movement causes relative movement of the two jaws, a lead screw engaging the nut and gearing to turn the lead screw comprising an intermittent gear and a reversing gear.

17. In apparatus of the type described for producing welded wire fabric, the combination with means according to claim 16, of a stationary bar serving to guide the finger during its traverse and means adjustable to vary the friction between finger and bar.

18. In apparatus of the type described for producing welded wire fabric, a series of welding dies, means adapted to support warp wires between said welding dies, a finger adapted to grip a weft wire, means adapted to traverse the finger and gripped weft wire across the warp wires and to hold them stationary after traverse, means to operate the welding dies during the stationary period and means to effect the return traverse of the finger.

19. In apparatus of the type described for producing welded wire fabric, the combination with a plurality of pairs of welding dies, a beam carrying one die of each pair, means insulating each die from the said beam, a second beam yieldingly carrying the other die of each pair, and means adapted to cause one beam to approach and recede from the other beam, of means adapted to support a warp wire between the dies of each pair, and means adapted to feed a weft wire from a source of supply across the warp wires and between the dies of each pair, by traction on the free end of said weft wire.

20. In apparatus of the type described for producing welded wire fabric, the combination with a plurality of pairs of welding dies, a beam carrying one die of each pair, a spring-pressed member carrying the other die of each pair, a second beam adapted to carry the said members, and means whereby the dies carried by the said members are caused to approach and recede from the other dies of each pair, of means adapted to support a warp wire between the dies of each pair, and means adapted to feed a weft wire from a source of supply across the warp wire and between the dies of each pair, by traction on the free end of said weft wire.

21. In apparatus of the type described for producing welded wire fabric, the combination with a plurality of pairs of welding dies, a beam carrying one die of each pair, a spring-pressed member carrying the other die of each pair, a second beam adapted to carry the said members, and means whereby the dies carried by the said members are caused to approach and recede from the other dies of each pair, of means whereby each of said members may be retracted into a position in which the die carried thereby is inoperative and held in such retracted position, means adapted to support a warp wire between the dies of each pair, and means adapted to feed a weft wire from a source of supply across the warp wires and between the dies of each pair, by traction on the free end of said weft wire.

22. In apparatus of the type described for producing welded wire fabric, the combination with a plurality of pairs of welding dies, a beam carrying one die of each pair, a spring-pressed plunger carrying the other die of each pair, a second beam provided with holes in which the said plungers are adapted to slide, means whereby each of the said plungers may be retracted in its hole to an inoperative position and held in such position, and means adapted to cause one beam to approach and recede from the other beam, of means adapted to support a warp wire between the dies of each pair, and means adapted to feed a weft wire from a source of supply across the warp wires and between the dies of each pair, by traction on the free end of said weft wire.

23. In apparatus of the type described for producing welded wire fabric, the combination with welding dies, means adapted to support warp wires between said dies, and means adapted to feed a weft wire from a source of supply across the warp wires and between the welding dies, by traction on the free end of said weft wire, of a weft wire guide characterized by a cylindrical portion by which it is supported, and an operative end eccentric to the cylindrical portion.

24. In apparatus of the type described for producing welded wire fabric, the combination with welding dies, means adapted to support warp wires between said dies, and means adapted to feed a weft wire from a source of supply across the warp wires and between the welding dies, by traction on the free end of said weft wire, of a nozzle traversed by said weft wire and located between the source of supply and the feeding means, and a cutter blade adapted to co-act with the face of said nozzle to sever the weft wire.

25. In apparatus of the type described for producing welded wire fabric, the combination with welding dies, means adapted to support warp wires between said dies, and a finger adapted to grip and feed a weft wire from a source of supply across the warp wires, of a yieldingly supported nozzle traversed by the weft wire and adapted to be pressed by the said finger towards the source of supply so as to expose the end of weft wire.

26. In a process for producing welded wire fabric in which a series of warp wires are held in spaced relationship between a series of pairs of welding dies, feeding a weft wire from a source of supply, axially along a line between the welding dies and clear of the warp wires, by traction on its free end, and maintaining the weft wire in tension until it and the warp wires are gripped between the welding dies.

27. In a process for producing welded wire fabric in which a series of warp wires are held in spaced relationship between a series of pairs of welding dies, feeding a weft wire from a source of supply, axially along a line between the welding dies and clear of the warp wires, by traction on its free end, maintaining the weft wire in tension until it and the warp wires are gripped between the welding dies, and then relaxing the tension before welding.

28. In a process for producing welded wire fabric in which a series of warp wires are held in spaced relationship between a series of pairs of welding dies, feeding a weft wire from a source of supply, axially along a line between the welding dies and clear of the warp wires, by traction on its free end, maintaining the weft wire in tension until it and the warp wires are gripped between the welding dies, and then relaxing the tension by severing the weft wire from the source of supply before welding.

29. In a process for producing welded wire fabric in which a series of warp wires are held in spaced relationship between a series of pairs of welding dies, feeding a weft wire from a source of supply, axially along a line between the welding dies and clear of the warp wires, by traction on its free end, and pressing the weft wire on to the warp wires by means situated beyond the ends of the series of welding dies, before the weft and warp wires are gripped between the welding dies.

30. In a process for producing welded wire fabric in which a series of warp wires are held in spaced relationship between a series of pairs of welding dies, feeding a weft wire from a source of supply, axially along a line between the welding dies and clear of the warp wires, by traction on its free end, pressing the weft wire on to the warp wires by means situated beyond the ends of the series of welding dies, and maintaining the weft wire in tension until it and the warp wires are gripped between the welding dies.

31. In a process for producing welded wire fabric in which a series of warp wires are held in spaced relationship between a series of pairs of welding dies, feeding a weft wire from a source of supply, axially along a line between the welding dies and clear of the warp wires, by traction on its free end, pressing the weft wire on to the warp wires by means situated beyond the ends of the series of welding dies, maintaining the weft wire in tension until it and the warp wires are gripped between the welding dies, and then relaxing the tension before welding.

32. In a process for producing welded wire fabric in which a series of warp wires are held in spaced relationship between a series of pairs of welding dies, feeding a weft wire from a source of supply, axially along a line between the welding dies and clear of the warp wires, by traction on its free end, and pressing the weft wire on to the warp wires and the warp wire on to one of each pair of welding dies by means situated beyond the ends of the series of welding dies before the weft and warp wires are gripped between the welding dies.

In testimony whereof I have affixed my signature hereto.

ALAN ARMSTRONG.